3,067,189
DIENE POLYMERIZATION CATALYST
Jaroslav G. Balas, Orinda, Calif., assignor to Shell Oil Company, a corporation of Delaware
No Drawing. Filed Dec. 24, 1959, Ser. No. 861,761
3 Claims. (Cl. 260—94.3)

This invention relates to improvements in the polymerization of conjugated dienes. More particularly it relates to processes for the polymerization of conjugated dienes by the employment of novel polymerization catalysts.

It has been reported that conjugated dienes, as butadiene, isoprene, and the like, may be polymerized to produce cis 1,4-addition products by conducting the polymerization in the presence of certain organo-metallic catalysts. The products thus obtained are useful in the formation of rubber compositions. Those processes, however, have certain disadvantages which the present invention overcomes. For one thing, the prior art processes for the polymerization of conjugated dienes usually results in a product which contains substantial portions of catalyst residues which are not readily separated from the polymer. The catalyst residues, which remain in the polymer, are undesirable because they reduce the stability of the polymer and may hasten degradation and cross-linking. Another disadvantage is that the catalysts are expensive and difficult to handle. Additionally, the cis 1,4-addition products very often are of varying molecular weight from one batch to the next because the polymerization is very sensitive to variation in the catalyst composition.

It is an object of this invention to provide novel catalysts for the polymerization of conjugated dienes. It is another object of this invention to provide novel catalysts for the polymerization of conjugated dienes which will produce polymer having a high cis 1,4-content. It is still another object of this invention to provide novel polymerization catalysts and processes for the polymerization of conjugated dienes which catalysts are abundant, inexpensive and easy to handle. It is still another object of this invention to provide simple processes for the polymerization of conjugated dienes which processes employ the novel catalysts to produce polymer uniform molecular weight. Other objects will become apparent as the description of the invention proceeds.

These and other objects are accomplished by the process comprising polymerizing a conjugated diene at temperatures ranging from 0° C. to about 150° C. in the presence of a catalyst which is a reaction product of an acidic metal halide, a transition metal halide and a lithium compound selected from the group consisting of lithium alkyl, lithium aluminum hydride and lithium borohydride, the mole ratio of the acidic metal halide to the transition metal halide being greater than 1. In considering the two metal halides, it will be understood that the metals will always be different. Thus an acid metal halide as titanium tetrahalide and a transition metal halide as titanium trihalide normally will not be used together.

As previously indicated the present invention is directed to the polymerization of conjugated dienes such as isoprene, chloroprene, butadiene, and similar conjugated dienes. In the preferred embodiment the processes of this invention are particularly suited to the polymerization of conjugated dienes having from 4 to 8 carbon atoms with the species of butadiene being particularly suited. Accordingly, the invention is described in greater detail as it relates to the polymerization of butadiene but it will be understood that other conjugated dienes may be similarly polymerized. The monomeric conjugated diene preferably is in a form that is substantially free of impurities such as oxygen, oxygen-containing compounds, sulfur, sulfur-containing compounds, and the like. The present invention, however, may be employed for the polymerization of a mixture of conjugated dienes as isoprene-butadiene, chloroprene-butadiene, and the like as well as for the copolymerization of a conjugated diene with a mono-alpha-olefin as ethylene, propylene and the like.

The monomeric conjugated diene at the beginning of the polymerization is contained in solution with a hydrocarbon diluent. Among the hydrocarbon diluents aromatic hydrocarbons are preferred. Good results are also obtained with mixtures of liquid hydrocarbons wherein only a portion thereof is an aromatic or cyclic hydrocarbon as cyclohexane. In the most preferred embodiment benzene is used as the sole diluent for the conjugated diene although alkylated benzenes may be employed. Among the other hydrocarbons that may be employed there may be mentioned toluene, the xylenes, mesitylene, ethylbenzene and other normally liquid cyclic compounds. Cyclic compounds having active unsaturation in alkyl radicals are less preferred as they may copolymerize. In some cases, however, the unsaturation is not reactive and they may also be used particularly under the milder conditions of polymerization. Such hydrocarbons are represented by, for example, allylbenzene. Aliphatic hydrocarbons which may be employed include, for example, hexane, octane, isooctane, and the like, but such diluents are best employed in admixture with an aromatic hydrocarbon as benzene. When mixed hydrocarbon diluents are employed good results are obtained if the aromatic hydrocarbon is present in the order of about 5%, by weight, or higher.

The solution of the conjugated diene in the diluent may range from about 5%, by weight, to about 25%, by weight. Variations within this range may be made as desired in order to control viscosity and molecular weight of the polymer. At lower concentrations the viscosity of the polymer solution and the molecular weight of the polymer will be lower.

The novel catalysts of this invention are formed from three essential ingredients, i.e., an acidic metal halide, a transition metal halide and a lithium compound, all of which preferably are employed in substantially pure and anhydrous forms. Of the acidic metal halides, aluminum halides are preferred with the chloride being particularly preferred followed by aluminum bromide and the other aluminum halides all of which may be pretreated to remove moisture. Aluminum chloride that has been resublimed is found to be particularly outstanding for the production of cis 1,4-polymer of conjugated dienes. Other acidic metal halides that may be used in this invention include the halides of zinc, ferric, stannic, titanium (IV), and the like with the chlorides thereof being best. The acidic metal halide may also be referred to as "Lewis Acids."

The transition metal halide is not limited to any particular species but it is best to employ a metal halide of group VIII of the periodic table, particularly those appearing in the first long period of the periodic table including particularly cobalt and nickel. Other transition metal halides may be employed but they are considerably less suitable by reason of yield, conversions, rate of reaction, and quality of the polymer which is ultimately produced. The halides of the transition metals in order of preference include first the chlorides, followed by the bromides with the others being less suitable for the same reasons outlined above.

The third component may be selected from lithium borohydride, (LiBH$_4$), lithium aluminum hydride (LiAlH$_4$) or a lithium alkyl of the formula LiR wherein R is an alkyl radical preferably having 4 to 8 carbon atoms in a straight chain. Most preferred are lithium butyl and lithium amyl although other lithium alkyl compounds are fully operable but have the disadvantage that the rates of polymerization are somewhat lower.

The present invention may be adapted to produce any of the several forms of polymer by varying the selection of the components used to prepare the catalyst. This may be illustrated by making reference to polymer produced from butadiene which may appear in several forms such as the various 1,2-addition products, the trans 1,4-addition product and the most preferred species of cis 1,4-addition product. A polymer having a high cis 1,4-addition product of polybutadiene is easily obtained when the catalyst is prepared from the most preferred components, e.g., cobalt chloride, aluminum chloride and lithium butyl or lithium borohydride. Such a polymer will have a cis 1,4-content in the order of 95–98% or even higher. On the other hand, when a polymer is prepared from butadiene and a catalyst prepared with a group IV transition metal halide, as a titanium or zirconium chloride, it will be found that the cis content is substantially reduced and the trans 1,4-content is increased. Other transition metal halides that can be used in the preparation of the complex include, for example, those of vanadium, manganese, thorium, hafnium, and others but as previously indicated they are less preferred. While the catalysts of this invention are formed from essentially these components it will be appreciated that the catalyst may be suitably prepared from two or more components within each group without departing from the spirit of this invention. This is represented, for example, by a catalyst prepared from a mixture of aluminum chloride, aluminum bromide, cobalt chloride and/or nickel chloride and lithium butyl. Such mixtures would not normally be employed as it increases material handling costs. It is noteworthy, however, that there is some indication that such mixtures may be usefully employed to control molecular weight of the polymer particularly when nickel halides are involved in which event mixtures of the type indicated may be beneficially employed.

It is an outstanding advantage of the present invention that the catalysts are very simple to prepare. In essence all that is required is that the catalyst components be mixed in a hydrocarbon diluent of the type previously described and the reaction product be permitted to form. Preferably the hydrocarbon diluent for the monomer and the catalyst preparation should be the same and accordingly benzene or a benzene-containing mixture is preferred for the catalyst preparation. The catalyst formation is hastened if the hydrocarbon diluent containing the catalyst components are refluxed for a period ranging from a few minutes to a few hours. Alternatively the catalyst may be permitted to form from the components by merely allowing the mixture to stand for several hours. Excellent results are obtained however when the maximum amount of the catalyst components react and go into solution in the hydrocarbon diluent. One method of proceeding is to add the catalyst components to the hydrocarbon diluent, the mixture is heated and thereafter the excess solids are removed by filtering, centrifuging, or decanting. The catalyst is then in a soluble form which is contained in the hydrocarbon diluent. This technique produces an active form of catalyst. Additionally, it produces a catalyst composition which is uniform from one batch preparation to the next because, in essence, a saturated solution of the reaction product is contained in the hydrocarbon diluent. A third and very substantial advantage is that the catalyst is free of solids which would otherwise be mixed with the polymer to produce a product having less desirable qualities because of the adverse effect of large amounts of the catalyst residues. By far, the most preferred technique for the preparation of the catalysts of this invention comprises proceeding as above but excluding the lithium containing component, initially. After the other two components have been heated in the hydrocarbon diluent, as benzene or cyclohexane, and the solids separated, the third component, in solution if necessary, may be added to yield the reaction product.

The specific quantities of the components which are added to the hydrocarbon diluent will vary depending upon the solubilities of the particular components and the hydrocarbon diluent employed but in general, it is better to add an excess over that which will go into solution in the hydrocarbon diluent and the excess of the solid component may thereafter be separated. In the most preferred procedures the mole ratios of the above two components are added in the order of about 2:1 to about 5:1, respectively. In any case, the amounts of the active ingredients in the final product depends mainly on the solubility constants involved. The third component, i.e., the lithium alkyl or the lithium borohydride or the lithium borohydride or the lithium aluminum hydride may be present in any amount in excess of zero moles.

One of the principal advantages of the present invention is that the polymer will contain only small amounts of the transition metal. This is important because larger amounts of transition metal may cause the rubber to cross-link or deteriorate on aging. Aluminum on the other hand has far less, if any, tendency to promote oxidative degradation or cross-linking. Another advantage is that the present invention is less sensitive to impurities and thereby permitting greater latitude in operations. Still another advantage is that the present catalysts will permit very fast polymerization rates thereby allowing mass production by continuous production techniques. Yet another advantage is that the present catalyst will not readily alkylate the diluent whereas the converse may sometimes be true using other catalysts.

The quantity of the catalyst components that go into solution will vary widely depending on the choice of the components and the diluent, or solvent. As to the acidic metal halide and the transition metal halide the total may range from about 2 to 50,000 p.p.m. of the diluent. More often however the range will be in the order of 5 to 2,000 p.p.m. This will be seen to be quite low and a surprising feature of this invention is that such excellent results are obtained with small catalyst concentrations. The lithium compound contained in the diluent may be present in only trace amounts and yet afford substantial advantages. As the amount is increased the advantages are correspondingly increased and become quite pronounced at about 5 moles per mole of the transition metal. Highly suitable results are obtained with about 100 moles per mole of the transition metal. Thereafter improvements are less pronounced and by about 1000 moles per mole of the transition metal only small advantages may be realized.

The catalyst may be prepared in any suitable vessel that is closed to the atmosphere. Desirably, the vessel is flushed with an inert gas, as nitrogen, before the various ingredients are charged. Caution should be exercised as the components are added as the formation of the catalyst may be accompanied by the evolution of heat and cooling may be necessary. It is the better practice to store the catalyst in glass or glass lined vessels although the catalyst may be suitably stored in vessels of Hastelloy B or C or tantalum.

In conducting the polymerizations of this invention temperatures ranging from about −40° C. to about 150° C. may be employed. The particular temperature selected will vary depending upon certain variables which are inherent in the process. For example, the present invention is characterized by fast polymerization rates. In some cases it may be desirable therefore to conduct the polymerization at lower temperatures to slow down the polymerization. The slowdown of the polymerization in such cases facilitates production control and minimizes the danger of damaging the polymerization apparatus. In other cases, particularly where the catalyst is less active, it may be desirable to operate at the higher temperature, i.e., in the order of 40–100° C. or even 150° C. Another outstanding advantage of this invention is that the polymerization, in most cases, may be conducted easily at about room temperatures thereby minimizing the cost of heat transfer equipment.

Another means of controlling the rate of polymerization is by adjusting the amount of catalyst employed, which amounts vary depending on the particular components contained in the catalyst. In the most preferred embodiments, i.e., using a catalyst prepared from cobalt chloride and aluminum chloride, for example, very fast polymerizations are obtained with as little as 1 p.p.m. of cobalt based on the weight of the total reaction mixture. By reducing the amount, i.e. to .1 p.p.m. slower rates are obtained. With higher amounts, i.e. in the order of 20 p.p.m. the reaction may be so fast as to present the danger of damaging the apparatus. With other species of metal halides the rates will differ so that, in general, the amount of complex that is employed may vary from .01 to 200 p.p.m. of the transition metal based on the total reaction mixture. The lithium containing component will be present, as part of the total reactants, in the proportions previously indicated.

Another advantage of the present processes for polymerizing conjugated dienes is that the polymerizations are conducted at low pressures in the preferred procedures. In actual practice all that is normally required is that the polymerization reactor be sealed so as to exclude the atmosphere from the reactor. This is desirable because oxygen and moisture are harmful to the polymerization. Accordingly, in the preferred embodiment it will be found that atmospheric pressures are suitable when the polymerization is conducted at about room temperatures. When the polymerization is conducted at higher temperatures then higher pressure will be created within the reactor but in almost all instances it is unnecessary to increase the pressure from external sources. The preferred pressures are suitably defined as "autogenic pressures" which refers to the pressure created by the system under the conditions of reaction. Such pressures will vary depending upon the temperature, the nature and quantity of the diluent, and the like.

The polymerization may be begun by merely charging the catalyst to a solution of a conjugated diene in the hydrocarbon diluent while agitating the contents of the reactor. The catalyst is added to the reactor in such a manner that it does not come in contact with the atmosphere. Accordingly, the reactor is equipped with suitable fixtures to permit such charging of the catalyst and the conjugated diene. A typical procedure comprises preparing a solution of the conjugated diene in a separate vessel and thereafter metering the thus prepared solution to the reactor. If desired, the solution of the conjugated diene in the hydrocarbon diluent may be prepared in the polymerization reactor. It is best that the monomeric conjugated diene and catalyst be thoroughly mixed from the start and in a batch reactor this is simply accomplished by agitation while adding the catalyst. In continuous operations, which employ, for example, a tubular reactor, this may be accomplished by feeding the catalyst in at a point near the inlet for the diene. In batch and continuous operations the residence time of the polymerization mixture is controlled by any suitable means which are shown in the art.

As the polymerization proceeds the polymer will form and remain in solution so that at the end of the polymerization cycle a viscous liquid is obtained. The polymer is recovered by the addition of a coagulating agent as acetone, a lower alcohol, such as methanol, ethanol, or the like, whereupon a coagulum of the polymer is formed. The polymer is then recovered by merely separating the solid polymer from the liquid. It is another advantage of this invention that the coagulum need not be treated further in order to separate catalyst residues as the residues are sufficiently low after the first coagulation. This is of considerable importance since several washings of the polymer were necessary heretofore.

In addition to butadiene and isoprene, other conjugated dienes that may be polymerized according to the present invention include 2,3-dimethyl-1,3-butadiene, 2-ethyl-1,3-butadiene, 4-methyl-1 hexadiene, 2-methyl-1,3-pentadiene, 2-isopropyl-1,3-butadiene, 2,3,6-octatriene, 2-amyl-1,3-butadiene, piperylene and the like, as well as mixtures thereof.

The present invention is described in greater detail in the following examples.

*Example 1*

To a 100-milliliter flask, which is purged with nitrogen to remove air, is added 11 grams of aluminum chloride and 1 gram of cobalt chloride followed by 80 milliliters of benzene. After refluxing for several hours in the presence of nitrogen the contents of the flask are cooled to room temperature. There is obtained a solid layer on the bottom of the flask and an upper liquid layer which is a clear emerald green color. Ten milliliters of the green solution are then mixed with lithium borohydride in benzene. Thereafter one milliliter of the mixture is aded to 50 milliliters of a saturated solution of butadiene in benzene whereupon polymerization begins. The polymerization is at room temperature and normal pressure with constant agitation. After about 3 minutes the polymer solution becomes very viscous and the polymerization is ended by the addition of about 50 mls. of methanol whereupon a solid coagulates. The coagulum is identified as polybutadiene having a cis 1,4-content of about 96.8% and the balance being about equal quantities of the 1,2- and trans 1,4-units. Analysis is made by infrared spectrum of the polymer film. The polymer has an intrinsic viscosity of 6.2 dl./gm., determined in toluene at 25° C.

*Example 2*

The procedure of Example 1 is repeated in all respects except that the catalyst comprising the green solution and the solution of lithium borohydride is aged for 5 days at room temperature before being used in the polymerization. The resultant product has a cis 1,4-content of 98.1% and the intrinsic viscosity is substantially the same.

*Example 3*

The procedure of Example 1 is repeated except that the polymerization catalyst is prepared with 30 moles of lithium aluminum hydride per mole of $CoCl_2$. In this case the polymerization is so rapid as to be virtually uncontrollable.

*Example 4*

The procedure of Example 1 is repeated except that 2 milliliters of a .5 molar solution of lithium amyl is added to 10 ccs. of the clear emerald green liquid. Thereafter 2 ccs. of the resultant solution is used to polymerize a saturated solution of butadiene in 50 milliliters of benzene. The polymerization is conducted at normal temperature and pressure with constant agitation. After 5 minutes the polymerization solution is very viscous whereupon about 50 ccs. of isopropyl alcohol is added to the liquid and the resulting coagulum is separated by filtering. The polymer contains 99.1% cis 1,4-polybutadiene and has an intrinsic viscosity of 6.3.

*Example 5*

The procedure for catalyst preparation described in Example 1 is repeated except that the first catalyst solution is prepared from 12 grams of cobalt chloride and .5 cc. titanium tetrachloride as a 21%, by weight, solution in benzene. These components are refluxed for several minutes in benzene and the liquid fraction, which is a clear solution as in Example 1, is separated. Thereafter 1 milliliter of a 3 molar solution of lithium isobutyl in benzene is added to the solution. A saturated solution of butadiene in 50 milliliters of benzene is then polymerized with about 2 milliliters of the catalyst solution thus prepared. In this case the polymerization is terminated after about 10 minutes of reaction at normal temperatures and pressures. The product which is thereafter coagulated contains about 60% of the cis 1,4-addition product.

*Example 6*

A 50 cc. solution of benzene saturated with butadiene is used. It contained about 20% w. of butadiene. To the solution is added $2.8 \times 10^{-3}$ millimoles of lithium butyl as "clean-up reagent." No noticeable polymerization occurs in this operation. Finally, a premixed benzene solution of $9.7 \times 10^{-3}$ millimoles of cobalt (as $CoCl_2 \cdot 3AlCl_3$) and $9.7 \times 10^{-3}$ millimoles of lithium butyl is added. A fast polymerization followed which yields a 96.7% cis-polybutadiene of acceptable molecular weight. All of the foregoing was conducted at room temperature.

*Example 7*

To a flask containing 100 ccs. of cyclohexane is added 20 grams of zinc chloride and 2 grams of cobaltous chloride. The mixture is allowed to stand for several hours and thereafter .5 cc. of a solution of lithium borohydride in cyclohexane is added. The mixture is agitated for several minutes and the liquid fraction is separated. With one milliliter of the liquid fraction 50 milliliters of a saturated solution of butadiene is polymerized as in Example 1. The polymer which is recovered has a cis-content of about 98%.

*Example 8*

The procedure of Example 1 is repeated except that the aluminum chloride is replaced with an equivalent amount of aluminum bromide. In this case the polymer has a slightly lower cis 1,4-content.

*Example 9*

The procedure of Example 1 is repeated except that the cobalt chloride is replaced with nickel chloride. The polymer which is recovered has a cis 1,4-content of about 90%. In a companion experiment a mixture of about equimolar portions of cobalt chloride and nickel chloride are used. In this case the cis-content is about 98% and the intrinsic viscosity appears to be lower.

*Example 10*

The procedure of Example 1 is repeated except that isoprene is polymerized. In this case the polymer that is isolated has a substantially lesser amount of the cis 1,4-addition product.

In a series of experiments, using a variety of transition metal halides with acidic metal halides for the preparation of the catalyst, the preferred features of this invention are established. It should be noted, however, that in all cases substantial polymerization takes place and that the nature and amounts of the products vary depending mainly on the components selected for the formation of the catalyst. Among the transition metals that are found to be more active when used in the preparation of the catalyst there may be mentioned zirconium chlorides, vanadium chlorides, chromium chloride, manganese chloride and the corresponding bromides. Halogens other than the chlorides are also found to form useful catalysts.

While the cis 1,4-addition products find greatest utility in the manufacture of rubber products, particularly in the manufacture of tread stock for automobile and truck tires, polymers having substantial amounts of the trans 1,4-addition products and/or the 3,4-addition products are also useful for the production of rubber products which do not require the same physical properties. From the foregoing description it will be readily apparent that the various addition products may be prepared by varying, for example, the catalyst components, conditions of reaction and the like. Such variations, however, will be understood to be within the spirit of this invention.

This application is a continuation-in-part of copending application Ser. No. 759,858, filed September 9, 1958.

I claim as my invention:

1. The composition comprising the soluble reaction product of cobaltous chloride, aluminum chloride and lithium borohydride in a molar ratio of 1:2–5:5–100, prepared in the presence of a hydrocarbon diluent, the soluble reaction product being essentially free of solids, the aluminum chloride and cobaltous chloride each being dissolved in the hydrocarbon solvent in an amount ranging from 2–50,000 p.p.m.

2. The process comprising polymerizing butadiene at temperatures from $-40$ to $+150°$ C. in the presence of a catalyst according to claim 1.

3. A composition comprising the soluble reaction product of the complex formed in hydrocarbon medium between cobaltous chloride and aluminum chloride in a molar ratio of 1:2–5, said complex being then reacted with lithium borohydride in a cobalt:lithium molar ratio of 1:5–100.

References Cited in the file of this patent

UNITED STATES PATENTS

| | | |
|---|---|---|
| 2,953,554 | Miller | Sept. 20, 1960 |
| 2,954,367 | Vandenberg | Sept. 27, 1960 |
| 2,965,625 | Anderson | Dec. 20, 1960 |
| 2,977,349 | Brockway | Mar. 28, 1961 |

FOREIGN PATENTS

| | | |
|---|---|---|
| 543,259 | Belgium | May 30, 1956 |
| 543,292 | Belgium | June 2, 1956 |
| 551,851 | Belgium | Apr. 17, 1957 |
| 822,742 | Great Britain | Oct. 28, 1959 |
| 824,418 | Great Britain | Dec. 2, 1959 |